(12) United States Patent
Golway et al.

(10) Patent No.: US 11,429,440 B2
(45) Date of Patent: Aug. 30, 2022

(54) INTELLIGENT ORCHESTRATION OF DISAGGREGATED APPLICATIONS BASED ON CLASS OF SERVICE

(71) Applicant: Hewlett Packard Enterprise Development LP, Houston, TX (US)

(72) Inventors: Thomas Golway, Plandome, NY (US); Sandeep Panda, Houston, TX (US); Vinay Sahadevappa Banakar, Bangalore Karnataka (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 205 days.

(21) Appl. No.: 16/377,709

(22) Filed: Apr. 8, 2019

(65) Prior Publication Data
US 2020/0249999 A1   Aug. 6, 2020

(30) Foreign Application Priority Data
Feb. 4, 2019   (IN) .............................. 201941004407

(51) Int. Cl.
*G06F 9/50* (2006.01)
*G06F 9/48* (2006.01)

(52) U.S. Cl.
CPC .................. *G06F 9/50* (2013.01); *G06F 9/48* (2013.01); *G06F 9/4806* (2013.01);
(Continued)

(58) Field of Classification Search
CPC ........ G06F 9/48; G06F 9/4806; G06F 9/4843; G06F 9/4881; G06F 9/50; G06F 9/5005;
(Continued)

(56) References Cited

U.S. PATENT DOCUMENTS

| | | | |
|---|---|---|---|
| 2006/0149652 A1* | 7/2006 | Fellenstein | G06Q 30/08 705/35 |
| 2007/0011052 A1* | 1/2007 | Liu | G06Q 30/0283 705/20 |

(Continued)

OTHER PUBLICATIONS

Wikipedia, "The Innovator's Dilemma", available online at <https://en.wikipedia.org/w/index.php?title=The_Innovator%27s_Dilemma&oldid=885958425>, Mar. 3, 2019, 4 pages.
(Continued)

*Primary Examiner* — Charles M Swift
(74) *Attorney, Agent, or Firm* — Jaffery Watson Mendonsa & Hamilton

(57) ABSTRACT

Intelligent orchestration of disaggregated applications includes identifying available processing resources capable of performing the disaggregated applications; triggering each of the available processing resources to query corresponding dependent processing resources of the available processing resources to provide service levels and pricing for performing the disaggregated applications according to class of service; selecting by a matching tool qualified processing resources from the available processing resources and the corresponding dependent processing resources based on the service levels and the pricing; executing a contract between an orchestration tool and each of the selected qualified processing resources; and upon execution of the contract, triggering the selected qualified processing resources to execute the disaggregated applications.

21 Claims, 10 Drawing Sheets

(52) U.S. Cl.
CPC .......... *G06F 9/4843* (2013.01); *G06F 9/4881* (2013.01); *G06F 9/505* (2013.01); *G06F 9/5005* (2013.01); *G06F 9/5027* (2013.01); *G06F 9/5044* (2013.01); *G06F 9/5061* (2013.01); *G06F 9/5077* (2013.01); *G06F 9/5083* (2013.01); *G06F 9/5088* (2013.01)

(58) Field of Classification Search
CPC ...... G06F 9/5027; G06F 9/5044; G06F 9/505; G06F 9/5061; G06F 9/5072; G06F 9/507; G06F 9/5083; G06F 9/5088
See application file for complete search history.

(56) References Cited

U.S. PATENT DOCUMENTS

| | | |
|---|---|---|
| 2011/0138047 A1 | 6/2011 | Brown et al. |
| 2012/0131591 A1* | 5/2012 | Moorthi ................. H04L 67/10 718/104 |
| 2014/0380332 A1* | 12/2014 | Mathur ................. H04L 29/06 718/104 |
| 2015/0161681 A1 | 6/2015 | Maes et al. |
| 2015/0228003 A1 | 8/2015 | Iyoob et al. |
| 2016/0013985 A1* | 1/2016 | Reddy ................. H04L 41/5003 726/4 |
| 2016/0036655 A1* | 2/2016 | Burton ................. H04L 41/5029 709/223 |
| 2016/0057071 A1* | 2/2016 | Parikh ................. G06F 9/5011 709/226 |
| 2016/0337474 A1 | 11/2016 | Rao |
| 2018/0026904 A1* | 1/2018 | Van De Groenendaal ................. H04L 43/0817 709/226 |
| 2019/0068696 A1* | 2/2019 | Sen ................. H05K 7/1489 |
| 2019/0138361 A1* | 5/2019 | Bernat ................. G06F 9/485 |
| 2019/0208007 A1* | 7/2019 | Khalid ................. H04L 67/1021 |
| 2019/0230000 A1* | 7/2019 | Moghe ................. H04L 41/22 |

OTHER PUBLICATIONS

OKD; "OKD 3.6—Architecture—Service Catalog Components—Service Catalog"; printed on Nov. 15, 2018; 5 pages.

* cited by examiner

INTELLIGENT ORCHESTRATION OF DISAGGREGATED APPLICATIONS BASED ON CLASS OF SERVICE

BACKGROUND

Computing systems have been developed to provide various services over a computer network. Such computing systems may have multiple computer units available to perform the services. These computer units may be coupled together such that each computer unit performs certain tasks associates with the services. The computing systems are provided with architecture to distribute these tasks to the coupled computer units. Such computing systems may be limited to using the computer units within their existing structure according to their capability of performing select tasks. Also, such computing systems may be unable to adjust to meet service needs, or to dynamically address changes in service needs that may occur over time.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

Figure 1:
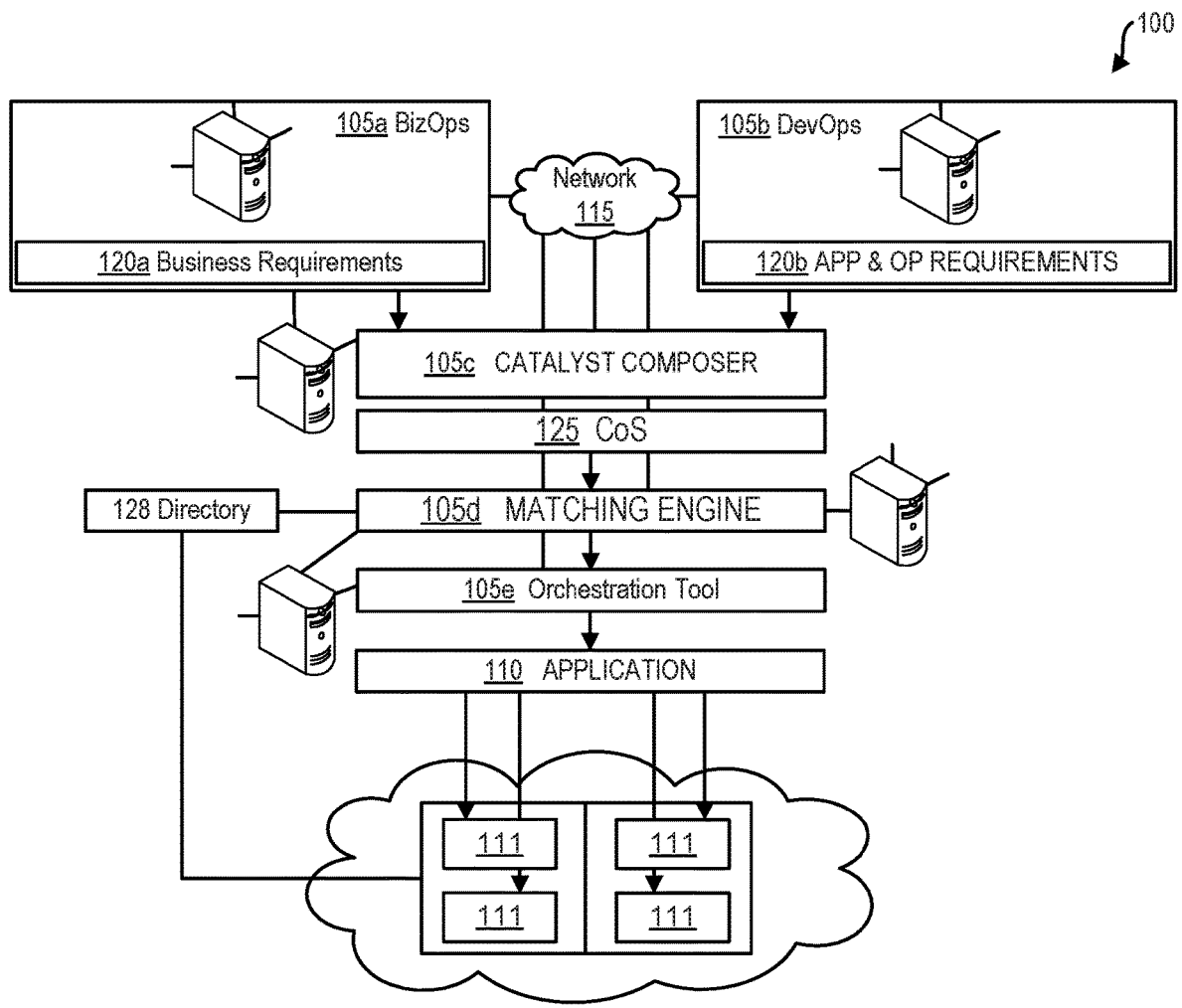
FIG. 1 depicts selected portions of a computing system, according to one or more examples of the disclosure.

While examples described herein are susceptible to various modifications and alternative forms, the drawings illustrate specific examples herein described in detail by way of example. It should be understood, however, that the description herein of specific examples is not intended to be limiting to the particular forms disclosed, but on the contrary, the intention is to cover all modifications, equivalents, and alternatives falling within the spirit and scope of the examples described herein and the appended claims.

DETAILED DESCRIPTION

Illustrative examples of the subject matter claimed below will now be disclosed. In the interest of clarity, not all features of an actual implementation are described in this specification. It will be appreciated that in the development of any such actual implementation, numerous implementation-specific decisions may be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Examples disclosed herein seek to address technological difficulties associated with performing services efficiently and within the service requirements (e.g., regulatory standards). Existing systems may have dependencies between microservices that affect latency, and cannot always meet regulatory requirements. Computing systems described herein seek to provide a decentralized system with global scale out capabilities that utilizes a broad range of processing resources that may be pooled to enhance performance and security, while also meeting regulatory requirements. The computing system may apply higher utilization of locally installed capacity by pooling sets of the internal processing resources with certain functions at a centralized onsite location within the computing system. The internal and/or external processing resources may be linked with specified dependencies to maintain data sovereignty and to maintain regulatory requirements. These dependencies may allow certain groups of interdependent processing resources to run services within their sub-location where their data is held, while also utilizing results for global/headquarter applications. Such services may be run upon demand, and dynamically adjust to changing demands and/or conditions.

Due to its decentralized structure, the computing system defines an open marketplace for enterprises, provides interoperable architectures, and prevents vendor lockdown. This decentralized structure also provides a hierarchy which maintains accountability by verifying each processing resource in the computing system pre-qualifies to perform the services, thereby verifying whether the processing resource(s) can meet regulatory and other requirements (e.g., compliance with laws of the country in which the processing resources sit) before the service is performed. The computing system also employs blockchain to provide smart contracting capabilities that ensure a service level agreement (SLA)/service level objective (SLO) match and to maintain security. The blockchain structure is used to verify identification of each of the contracting processing resources and to assure accountability of each resource to maintain requirements, thereby establishing an ecosystem of trust.

The computing system and method described herein are used to dynamically deploy and orchestrate disaggregated software components of business applications within a hybrid cloud environment according to a set of business and technical requirements. This system and method provide the ability to optimize in real-time, the processing of business applications through the use of multiple services across multiple providers. This allows the consumer to balance performance, compliance, security and cost across the providers and use arbitration to rebalance as either demand requirements or supply characteristics change.

An example computing system (e.g., multi-core processing system) for orchestrating disaggregated applications (services) includes a computer resource coupled to a peer-to-peer cloud of internal processing resources (private cloud) and external processing resources (public cloud). The computing system seeks to enable on-demand access to a variety of processing resources as needed to meet business and technical needs. Such processing resources may be searched and selectively accessed based on their individual and/or pooled ability to perform requested services on an ever changing as needed basis.

The computing system orchestrates the processing resources (e.g., microprocessors) in a scale out environment to perform the requested services. These services are orchestrated according to available processing resources, and the corresponding capabilities of such available processing resources to perform according to business and operational needs. Directories of available microservices may be queried to determine optimal processing resources for performing the application. Such queries may extend to the internal processing resources within the computing system (the private cloud), and to external processing resources outside of the computing system (the public cloud). The external processing resources may be used as backups and leased 'on demand' when internal processing resources are unavailable, unable to perform the required services according to requirements, and/or less feasible (e.g., cost effective) than the external processing resources. The processing resources may be selected based on their ability to perform a class of service (CoS) and to meet service requirements for the specified service. Such service requirements may include, for example, bandwidth, latency, regulatory standards, location, etc.

In some examples, a method is provided for orchestrating disaggregated applications. The method comprises identifying available processing resources capable of performing the disaggregated applications; triggering each of the available processing resources to query corresponding dependent processing resources of the available processing resources to provide service levels and pricing for performing the disaggregated applications according to class of service; selecting by a matching tool qualified processing resources from the available processing resources and the corresponding dependent processing resources based on the service levels and the pricing; executing a contract between an orchestration tool and each of the selected qualified processing resources; and upon execution of the contract, triggering the selected qualified processing resources to execute the disaggregated applications.

In some examples, a computing device is provided with a non-transitory machine-readable storage medium. The non-transitory machine-readable storage medium includes instructions, that, when executed, causes a computing system to perform the method. In some examples, a computing system is provided for orchestrating disaggregated applications. The system comprises processing resources; a system memory; a bus; and a computing resource for use in the computing system residing on the memory that, when invoked, performs the method.

Turning now to the drawings, FIG. 1 illustrates selected portions of a computing system 100, according to one or more examples of the disclosure. The computing system 100, when invoked, performs methods of orchestrating disaggregated applications as is described further herein. The computing system 100 includes computing resources 105a-e, coupled together by a network 115 over which the computing resources 105a-e communicate. The computing system 100 is used to perform applications (services) 110 on a cloud infrastructure through a client interface, such as a web browser.

"Application" as used herein refers to a service or set of services for use with storage, processing, memory, network bandwidth, and virtual machines. Such applications (or services) may be completed by performing one or more tasks. A combination of the tasks performed in a sequence completes the application. Examples of existing systems used to perform services (applications) are described in US Patent Application Nos. 2011/0138047, 2015/0161681, 2015/0228003, 2016/0337474, the entire contents of which are hereby incorporated by reference herein.

The cloud infrastructure may include cloud software (e.g., Software as a Services (SaaS)), a cloud platform (e.g., Platform as a Service (PaaS), and cloud infrastructure (e.g., Infrastructure as a Service (IaaS)), and may be employed on a private, community, and/or public cloud. The computing resources 105a-e may include one or more servers, computers, and associated computing devices defining an orchestrated computing environment that resides on one or more computing apparatuses for performing the applications 110. The computing apparatuses may also be coupled to or include an administrative console for the computing system 100. However, other examples may implement this feature in other ways.

The computing resources 105a-e may include, for example, a business operations (BizOps) 105a, development operations (DevOps) 105b, a catalyst composer 105c, a matching engine 105d, and an orchestration tool 105e. The computing resources 105a-e and/or other portions of the computing system 100 includes a variety of storage (computer readable) media. Such media may be any available media that is accessible by the computing system 100 and/or the computing resources 105a-e.

As used herein, "computer readable medium" or "machine-readable storage medium" may include a storage drive (e.g., a hard drive), flash memory, Random Access Memory (RAM), any type of storage disc (e.g., a Compact Disc Read Only Memory (CD-ROM), any other type of compact disc, a DVD, etc.) and the like, or a combination thereof. In some examples, a storage medium may correspond to memory including a main memory, such as RAM, where software may reside during runtime, and a secondary memory. The secondary memory can, for example, include a nonvolatile memory where a copy of software or other data is stored.

The computing resources 105a-e may perform the applications 110 based on business requirements 120a and operating requirements 120b. The business requirements 120a may be received by the BizOps 105a, and the operating requirements 120b may be received by the DevOps 105b. The business requirements 102a may include requirements, such as risk, benefits, opportunity etc., that seek to address a value proposition based on business needs. The operating requirements 120b may include, for example, standards, specifications, criteria, and/or other regulatory requirements defined for performing the application 110. Such requirements may include, for example, business, compliance, technical, microservices, and IT operations, as well as other requirements. The operating requirements may specify the technical capabilities, such as latency, regulatory, or other specifications (standards), necessary for the processing resources to perform the services.

The business requirements 120a and operating requirements 120b may be passed to the catalyst composer 105c to define class of service (CoS) 125 for performing the applications 110. The catalyst composer 105c is a software component, such as web service or a daemon, that defines the CoS 125 based on the business requirements 120a and the operating requirements 120b. The CoS 125 may be based on a standard definition of functional, technical, and governance parameters for resource pools to enable automated pricing strategies by CoS 125 feeding smart contracts. The business requirements 120a and operating requirements 120b with which the data file is populated may utilize various CoS 125, such as bandwidth, latency, business requirements, regulatory, compliance, risk, etc., for performing the application 110. "Class of service" or "CoS" as used herein refers to is a set of technical attributes, business dependencies and governance model required to support the use case business outcome. CoS for the processing resources may be inherited, application-specific, and run-time specific.

The CoS 125 may be defined by the catalyst composer 105c, which may work with the matching engine 105d and the orchestration tool 105e to provision the processing resources 111 based on the CoS 125 as is described further herein. The catalyst composer 105c and matching engine 105d may be invoked by a user through a user interface, upon power up, reset, or both, or through some other mechanism depending on the implementation of the operating system.

The CoS 125 is passed to the matching engine 105d to locate available processing resources that meet the CoS 125. The matching engine 105d may be used to search a directory 128 to identify the processing resources 111 that meet the CoS 125 as is described further herein. The directory 128 may be a system directory located with the computing resources 105a-e, or a resource directory located with the resources 111. One or more directories 128 may be used and located in one or more locations.

The matching engine 105d may also perform the SLA/SLO negotiations via a blockchain as is described further herein. Examples of techniques for negotiations via smart contract function in blockchain are commercially available from ACCENTURE® www.accenture.com. Once processing resources 111 capable of meeting the CoS 125 are located, the orchestration tool 105e instantiates and manages the matching engine 105d for selecting one or more processing resources 111 to execute one or more of the applications 110 according to the CoS 125.

The computing resources 105a-e cooperate to perform the applications 110 via one or more of the processing resources 111. As used herein, a "processor" or "processing resource" may include any circuitry that is capable of executing machine-readable instructions, such as central processing units (CPUs), microprocessors, microcontrollers, digital signal processors (DSPs), field-programmable gate arrays (FPGAs), application-specific instruction set processors (ASIPs), etc.

The processing resource 111 may be, for example, a processor, a processing chipset, or a group of processors depending upon the implementation of the computing system 100 or the computing resources 105a-e. The processing resources 111 may be, for example, in the form of a central processing unit (CPU), a semiconductor-based microprocessor, a digital signal processor (DSP) such as a digital image processing unit, other hardware devices or processing elements suitable to retrieve and execute instructions stored in a storage medium, or suitable combinations thereof. The processing resource 111 can, for example, include single or multiple cores on a chip, multiple cores across multiple chips, multiple cores across multiple devices, or suitable combinations thereof. The processing resource 111 can be functional to fetch, decode, and execute instructions. One or more of the processing resources 111 may be used separately and/or in combination to perform one or more tasks to complete the application 110 as described herein.

While FIG. 1 shows an example computing system 100 with selected components that can be used, it will be appreciated that variations may exist. The computing system 100, computing resources 105a-e, and/or processing resources 111 may include one or more additional hardware components (e.g., memory, processors, directories, etc.) and/or software components (e.g., micro executioner, blockchain, smart contract, etc.). One or more components of the computing system 100, such as orchestration tool 105e and portions of the processing resources 111 (e.g., the supply resource manager and API described herein), may be combined to perform one or more of the functions described herein. In some cases, the combination may be helpful to manage, others may be restrictive or limit operation of such components.

Figure 2:
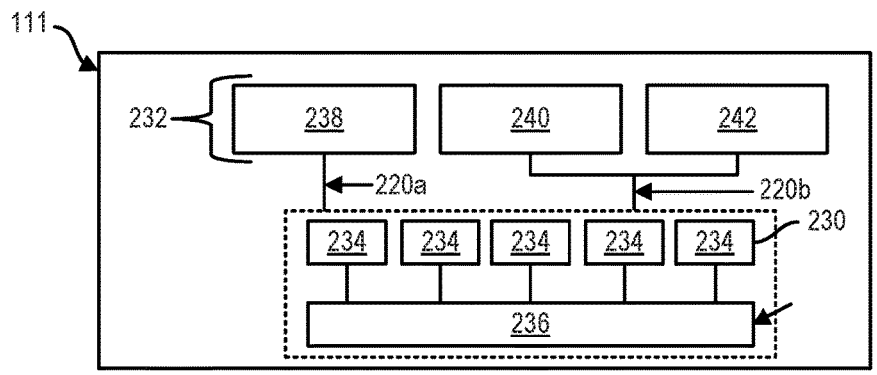
FIG. 2 is a block diagram of a processing resource, according to one or more examples of the disclosure.

FIG. 2 is a block diagram of an example processing resource usable with the computing system 100, according to one or more examples of the disclosure. The processing resource 111 in this example is in the form of a multi-core microprocessor 111, and includes a chip package 230 and interface components 232. The chip package 230 includes multiple cores 234 and a connectivity fabric 236. The interface components 232 include a dynamic ram (DRAM) 238, an I/O device 240, and a storage 242.

The cores 234 within the chip package may be identical independent processing units that operate independently. The cores 234 may be designed for general purpose use, or the cores 234 may be optimized for specific tasks. The cores 234 may be coupled within the chip package 230 via the connectivity fabric 236 to enable the cores 234 to share a memory cache and exchange information. The cores 234 may have one or more input/output (I/O) buses 220b to connect to a variety of I/O devices 240, such as a network interface, and storage devices 242, such as non-volatile memory devices (disks).

The cores 234 may have one or more memory buses 220a to connect to DRAM memory 238 external to the chip package 230. The buses 220a, 220b may be any suitable bus system employing any suitable bus protocol. The memory 238 may include some combination of read-only memory ("ROM") and random-access memory ("RAM") implemented using, for instance, magnetic or optical memory resources, such as magnetic disks and optical disks. Portions of the memory 238 may be removable. The memory 210 may also be encoded with an operating system.

Figure 3:
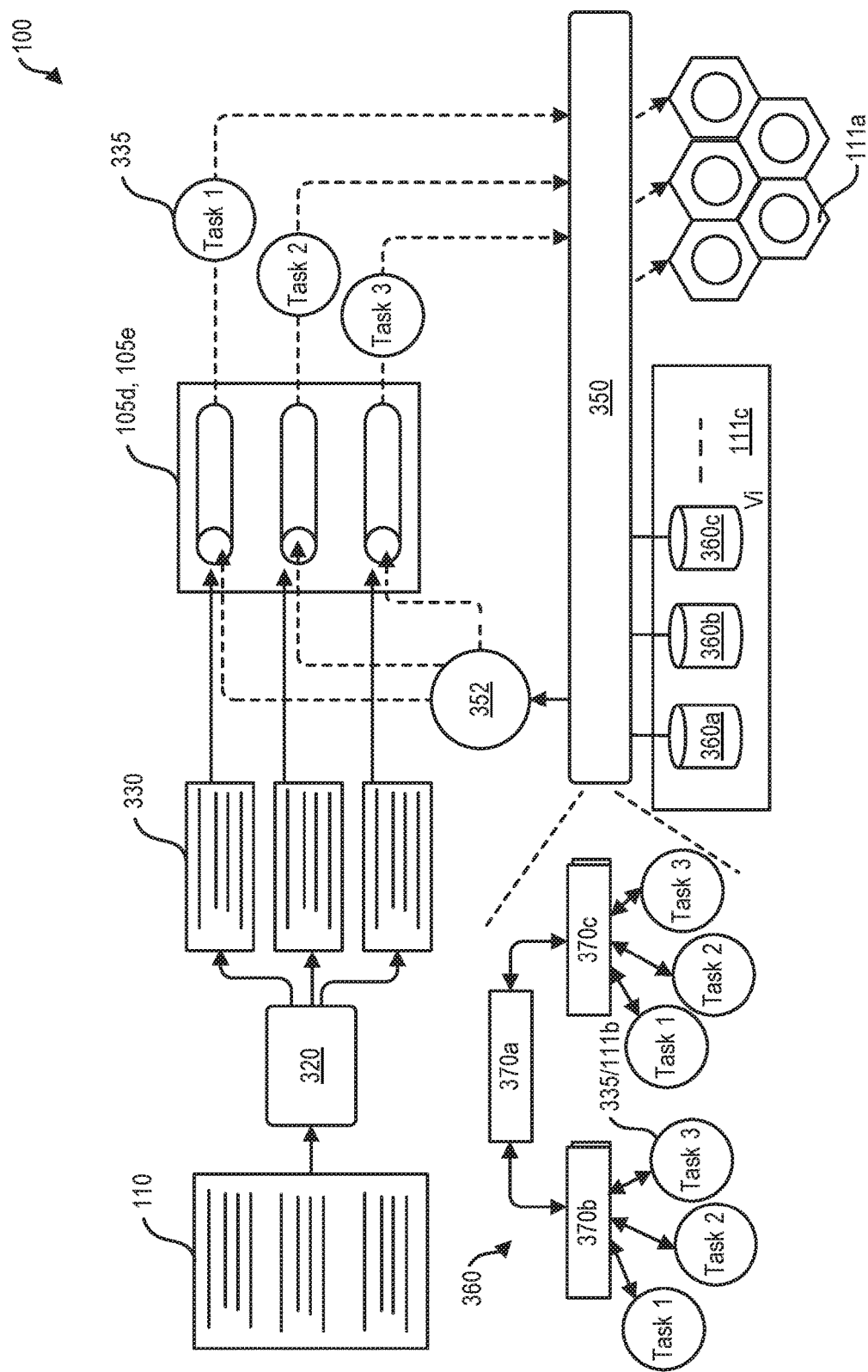
FIG. 3 is a flow diagram depicting operation of the computing system, according to one or more examples of the disclosure.

FIG. 3 is a flow diagram depicting a method of operation of the computing system 100. As shown in this example, application (user code) 110 is entered into the computing system 100, and tasks 335 to complete application 110 are generated 330 using asynchronous task identification 320. The matching engine 105d matches the identified tasks 335 with the processing resources 111a-c capable of performing the identified tasks 335, and the orchestration tool 105e deploys the tasks 335 to one or more of the processing resources 111a-c through a blockchain 350. A micro executer 352 is provided to monitor the processing resources 111a-c and feedback data from the processing resources 111a-c to the matching engine 105d to update the tasks 335 to be performed.

The processing resources 111a-c are available individually at various locations, and through virtual resource pools. As schematically shown, the processing resources 111a-c may be in the form of local (independent) processing resources 111a, external processing resources 111b, and/or assembled processing resources 111b. The application 110 may be performed by orchestration of the tasks 335 to one or more of the individual processing resources 111a, one or more of the pooled processing resources 111b, and/or one or more of the assembled processing resources 111b. The orchestrated processing resources 111a-c may be selectively activated to perform the tasks 335 in a desired sequence, and complete the application(s) 110.

In this example, the matching engine 105d is shown with the orchestration tool 105e. The matching engine 105d (FIG. 1) negotiates with the various the processing resources 111a-c to select and contract with the optimal arrangement of processing resources 111a-c to perform the tasks 335. Once selected, the orchestration tool 105e deploys the tasks 335 to the selected processing resources 111a-c to perform the tasks 335.

The independent processing resources 111a may be coupled to or part of the computing system 100. Each of the independent processing resources 111a may perform one or more of the tasks 335 dependently, independently, simultaneously, sequentially, etc. These independent processing resources 111a may be located (e.g., stacked) together for cooperative operation as shown.

The external processing resources 111b may be pooled into a virtual resource pool 360 to perform the tasks 335. The processing resources 111b are shown as being assembled into a tree of dependent processing resources 111b that are related to cooperatively perform one or more of the tasks 335 using a nesting configuration. Each of the task 335 is performed by an assigned one or more of the processing resources 111b in the pool 360. Each of the task 335 may be coupled to a corresponding one of the processing resources 111b targeted for its differentiated service required of the application 110, and defined CoS with minimum parameters for operation.

The virtual resource pool 360 is a hierarchical arrangement of microservices defined for performing the tasks 335. As also schematically shown, the virtual resource pool 360 may employ a governing microservice 370a (or cluster manager) to direct dependent microservices 370b to perform the specified tasks 335. Microservices as used herein refers to a piece of software code usable by one or more applications. The microservices may be accessible by one or more of the processing resources concurrently or independently for performing one or more tasks and/or applications.

The assembled (variant) processing resources 111c may be assembled from existing composable infrastructure equipment, such as processing (computing) 360a, storage 360b, and network 360c equipment. This infrastructure equipment may be assembled 'on the fly' infrastructure equipment, such as SYNERGY® commercially available from HEWLETT PACKARD ENTERPRISE® out of Palo Alto, Calif. Once tasks are performed by the assembled processing resources 111c, the processing resources 111c may be disassembled.

Figure 4:
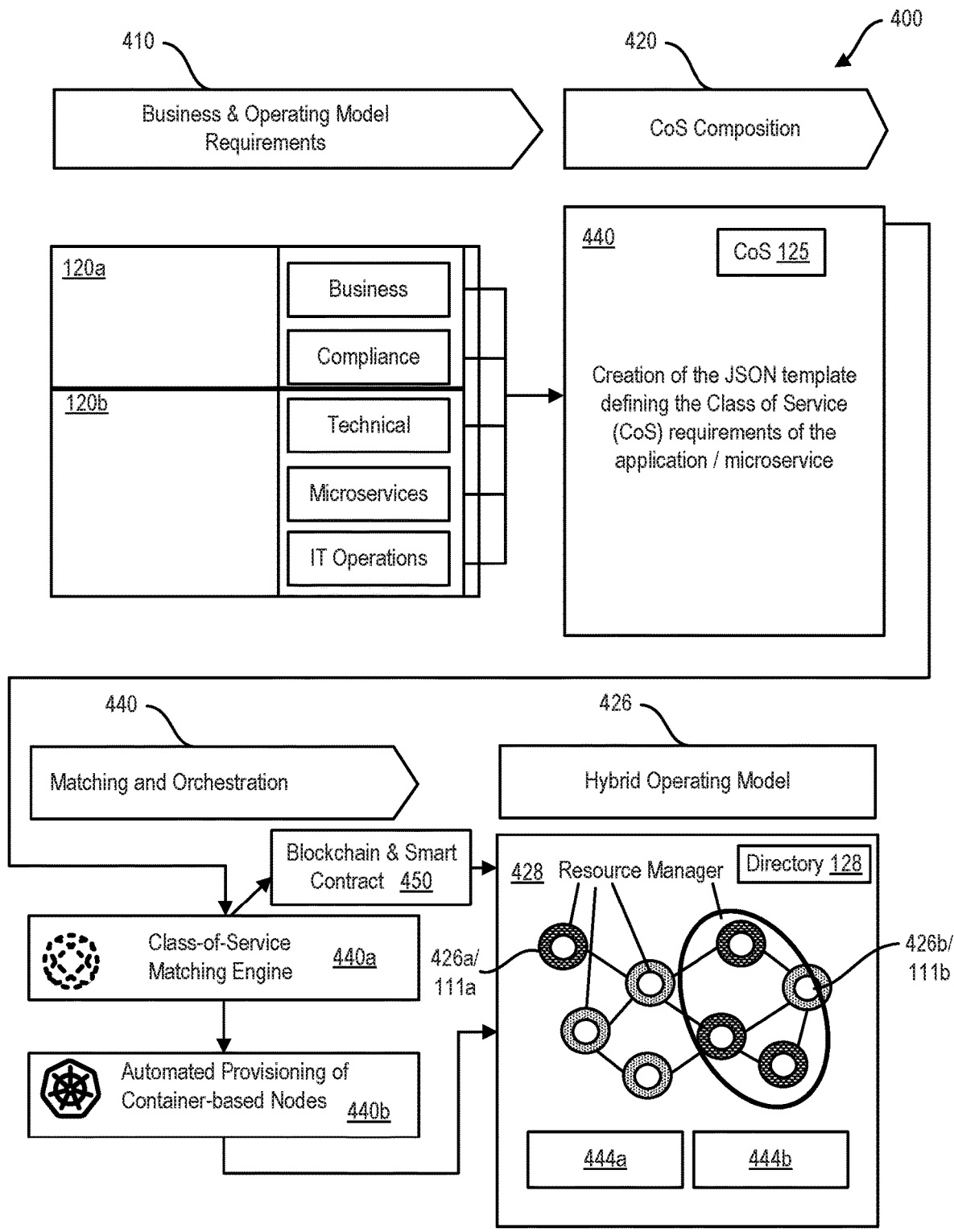
FIG. 4 is a flow diagram depicting operation of the computing system, according to one or more examples of the disclosure.

FIG. 4 is a flow diagram depicting a method 400 of operation of the computing system, according to one or more examples of the disclosure. The flow diagram 400 as shown includes business & operating model requirements 410, the CoS composition 420, matching & orchestration 440, and a hybrid operating model 426. The model requirements 410 are used as inputs to define needs for performing the services.

The model requirements 410 may include the business requirements 120a and operating requirements 120b. In the example shown in FIG. 4, the business requirements 120a include business process and compliance requirements for performing the service. Other business requirements may include customer needs, business partner needs, etc. As also shown in FIG. 4, the operating requirements 120b include technical, microservices, and IT operations. The operating requirements may include a variety of the technical capabilities, such as latency, regulatory, or other specifications (standards), necessary for the processing resources 111 to perform the applications as needed.

The CoS composition 420 may use the catalyst composer 105c (FIG. 1) to receive the model requirements 410 and calculate corresponding CoS 125 for the given application (microservice). The CoS composition 420 defines the CoS 125 of the microservice for use in selecting the processing resources 111 to perform the microservices. The CoS composition 420 may create a template, such as a JavaScript Object Notation (JSON) or other mutations-based template that uses human-readable text to transmit data objects to define the CoS 125. The CoS composition 420 may act as a dependency manager for libraries in the computing system 100.

Figure 5:
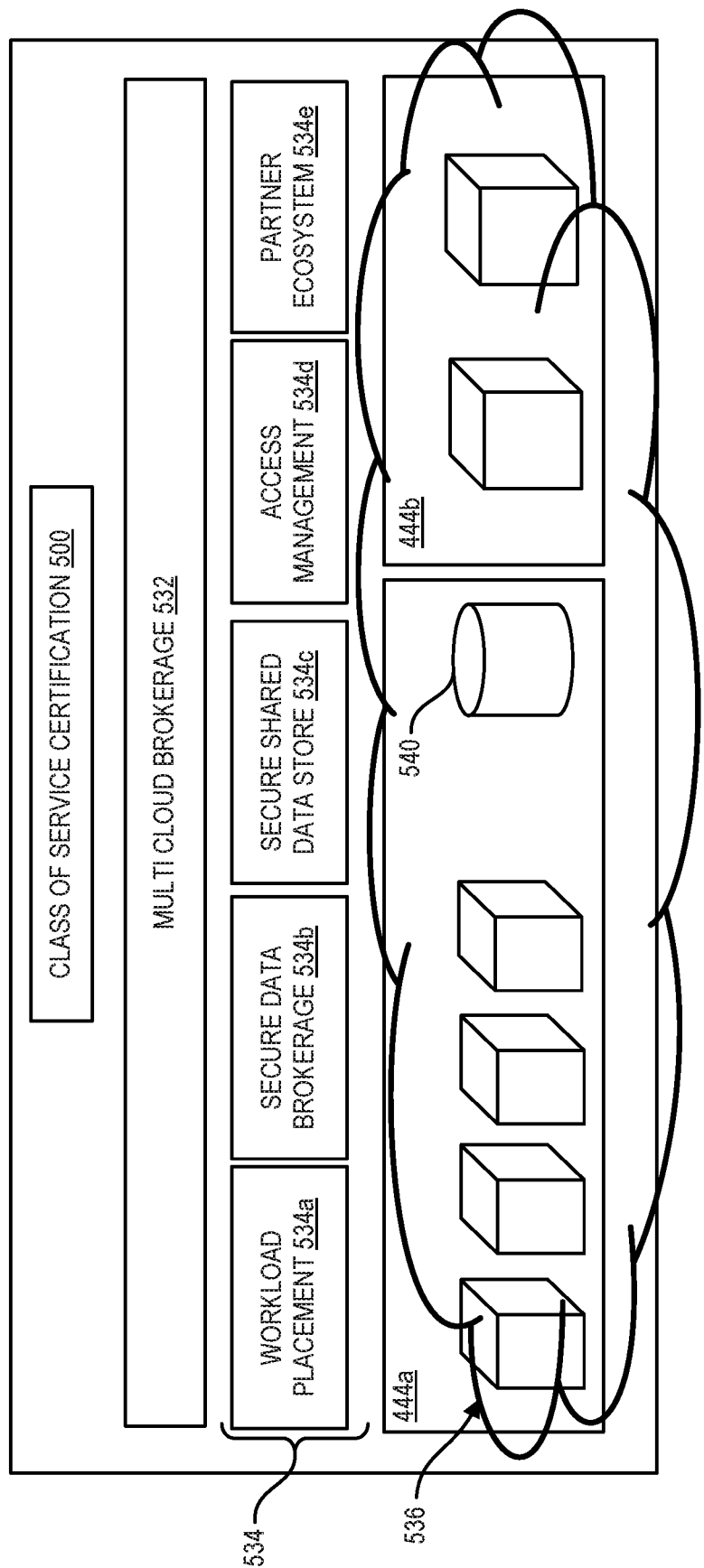
FIG. 5 is a schematic of class of service certification, according to one or more examples of the disclosure.

FIG. 5 is a schematic of CoS certification 500, according to one or more examples of the disclosure. This figure shows an example of CoS certification 500 that may be used by the CoS Composition 420. The CoS certification 500 includes a multi cloud brokerage 532, CoS 534, and clouds 444a, b. CoS Certification 500 may be used, for example, to restrict access to the computing system 100 for performing applications and/or associated tasks, for example to limit tenants occupying a given area.

The multi cloud brokerage 532 is a cloud broker used to manage the use, performance, and delivery of cloud services. The multi cloud brokerage 532 also negotiates relationships between cloud providers. As shown in FIG. 5, the multi cloud brokerage 532 may be a cloud management service that composes clouds capable of supporting applications. An example multi cloud brokerage 532 that may be used is HPE ONESPHERE™ developed by HEWLETT PACKARD ENTERPRISE® of Palo Alto, Calif.

The CoS 534 specifies requirements for performing the application. As shown in FIG. 5, the CoS 534 may employ tools used to support the CoS 534, such as workload placement 534a, secure data brokerage 534b, secure shared data store 534c, access management 534d, and partner ecosystem 534e. These and other CoS 534 may be specified to direct data traffic to the various processing resources (e.g., 111 of FIG. 4).

The private cloud 444a includes a local pool 536 of processing resources (microprocessors) with specific capabilities. The local pool 536 may include one or more computers capable of performing specified applications. The local pool 536 may be centralized in location and/or capability so that specified applications may be performed locally. For example, where certain sensitive or repeat functions are performed, a local pool 536 may be defined for performing such functions. The local pool 536 may also be provided with a trusted common storage 540 for maintaining data internally within the computing system.

The public cloud 444b includes external processing resources (microservices) that may be selectively accessed by the computing system 100. These external microservices may be 'leased' on an as needed basis when the internal processing resources are unavailable, incapable, and/or inefficient by comparison. Examples of external processing resources include AMAZON WEB SERVICES®, MICROSOFT AZURE®, VMWARE®, SOFTLAYER®, ALERTLOGIC®, SECURITY-AS-A-SERVICE®, etc.

Referring back to FIG. 4, the matching and orchestration 440 includes a CoS matching engine 440a and automated provisioning of container-based nodes 440b. The matching and orchestration 440 receives the CoS 125 from the CoS composition 430, and locates the processing resources 111 (shown as nodes) with the capabilities to perform applications according to the CoS 125. The matching engine 105d (FIG. 1) may be used to select processing resources 111a, 111b from a variety of the processing sources 111a,111b both locally and remotely. Once the processing resources 111a, 111b are selected, the automated provisioning 440b uses the orchestration tool 105e (FIG. 1) to automatically provision container-based nodes in a hybrid operating model 426 as is described further herein. This provisioning involves selecting the processing resources 111a,111b based on the CoS 125. For example, the matching may involve selecting a narrowest band from inherited CoS, application-specific CoS, and run-time CoS for the available processing resources.

The hybrid operating model 426 includes a resource manager 428 and processing resources 111a,111b, to select the processing resources 111 that meet the CoS 125. The matching and orchestration 440 works with the hybrid operating model 426 to locate and use the processing resources 111a,111b. The CoS matching engine 440a goes to the resource manager 428 to perform smart contract and blockchain 450 to execute contracts with the selected processing resources 111a,111b. A negotiation occurs to assure the processing resources 111a,111b meet the CoS 125, and has the best pricing available. For example, the processing resource 111a,111b may provide a time estimate and a cost for performing one or more tasks and/or applications. This information may be used by the matching engine 105d to negotiate the contract.

The resource manager 428 searches available processing resources 111a,111b in the hybrid operating model 426. The hybrid operating model 426 includes the private cloud 444a of nodes 426a and a public cloud 444b of nodes 426b that combine to form a hybrid cloud. The private cloud 444a of nodes 446a includes local processing resources 111a internal to the computing system 100. The public cloud 444b of nodes 446b includes local processing resources 111b external to the computing system 100.

Figure 6:
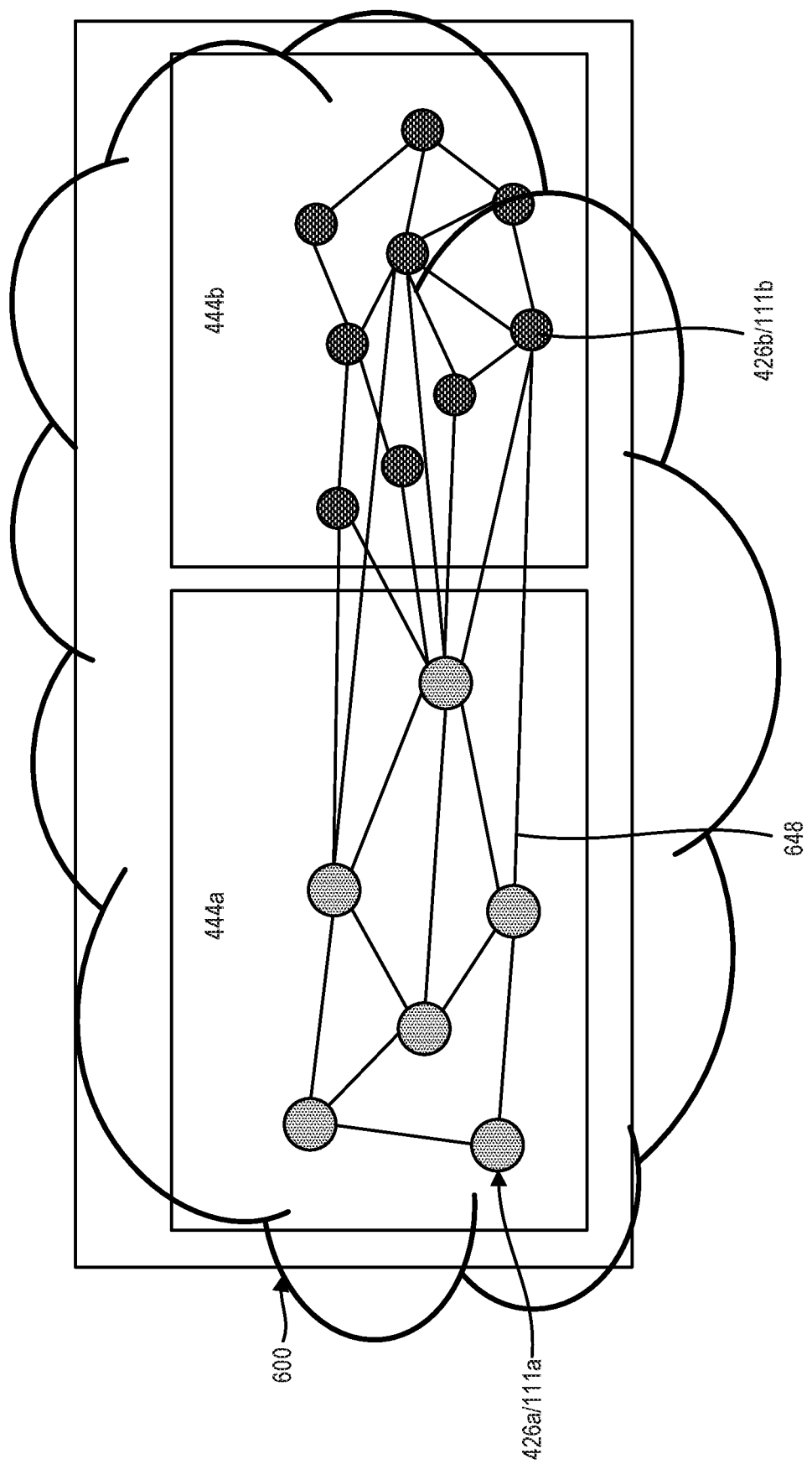
FIG. 6 is a schematic of a hybrid cloud, according to one or more examples of the disclosure.

FIG. 6 is a schematic of the hybrid cloud 600, according to one or more examples of the disclosure. The hybrid cloud 600 includes a combination of the private cloud 444a of nodes 426a and a public cloud 444b of nodes 426b. The internal processing resources 111a of the private nodes 426a may operate independently, and have an associated directory with various specified requirements, such as capabilities, capacities, and standards. The nodes 426a of the private cloud 444a may have access to private data centers. The external processing resources 111b of the public nodes 426a may be interdependent. The nodes 426b of the public cloud 444b may have infrastructure located within a third-party data center.

Each of the nodes 446a,b within each of the clouds 444a, 444b is connected by links 648. Two or more of the processing resources 111a,111b of the private clouds 444a and the public clouds 444b may be interconnected by the links 648. The interconnected web of links 648 define dependencies between the processing resources 111a,111b for selecting microservices and performing the applications. The links 648 may also define a sequence for performing tasks and/or sharing data. Each of the processing resources 111a,111b may have one or more links 648 to one or more other local or remote processing resources 111a,111b selected to cooperatively work together.

Figure 7:
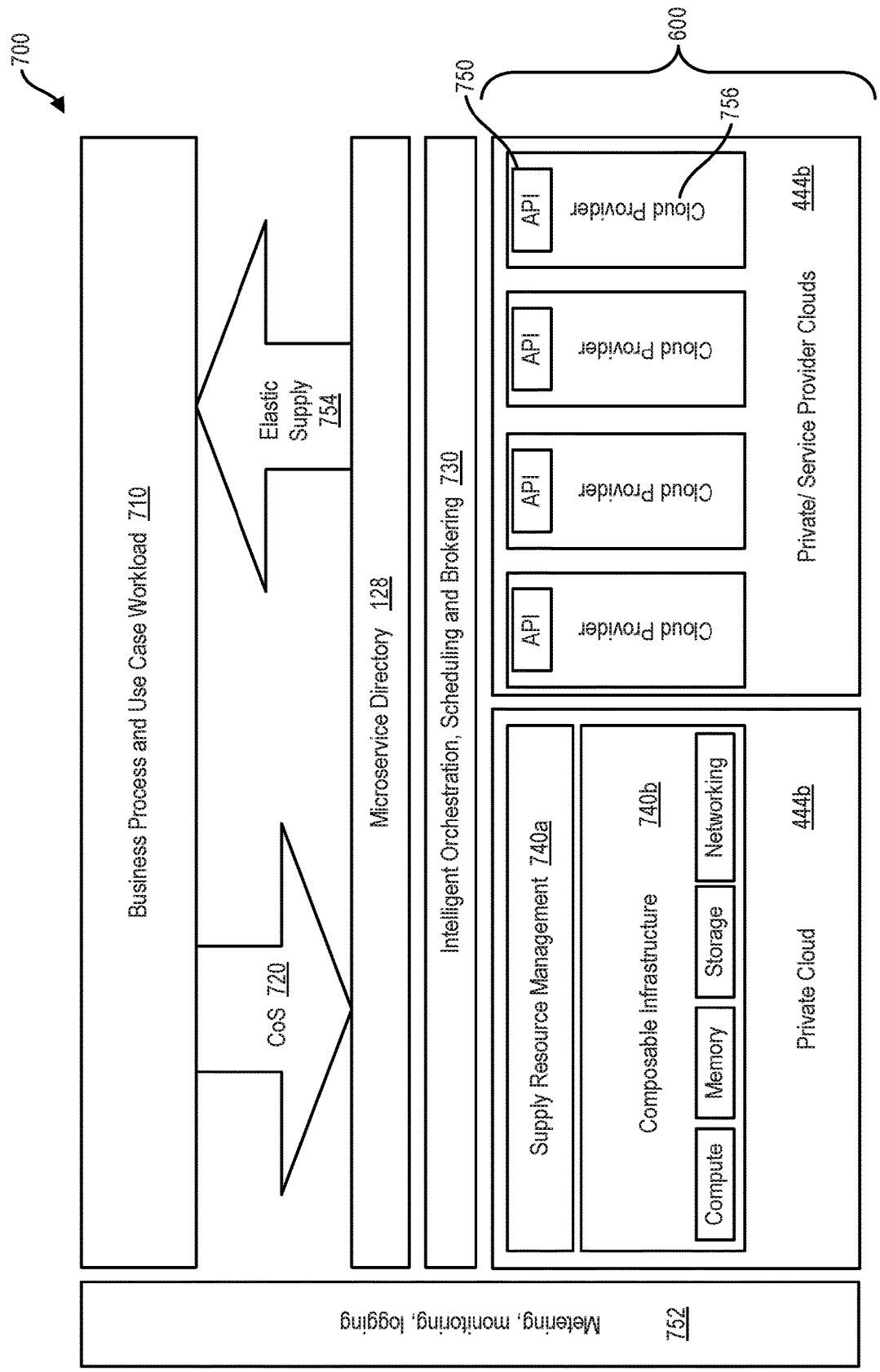
FIG. 7 is a schematic depicting dynamic operation of the computing system, according to one or more examples of the disclosure.

FIG. 7 is a schematic diagram 700 depicting dynamic operation of the computing system 100 according to one or more examples of the disclosure. As shown in this view, based on business process and use case workload 710, the computing system 100 applies the CoS 720 to the hybrid cloud 600 (FIG. 6). The matching engine 105d (FIG. 1), in combination with the supply resource management 740a for the private cloud 444a and application programming interface (API) 750 for the public cloud 444b, searches the system directory 128 for available processing resources in the hybrid cloud 600 that can meet the CoS 720. Using the orchestration tool 105e (FIG. 1) in conjunction with the matching engine 140 (FIG. 1), the available processing resources may then be intelligently orchestrated 730 (e.g., selected, scheduled, and brokered) based on their ability to meet the CoS 720.

The available processing resources may be located in the private cloud 444a and the public cloud 444b. Once supply resource management 740a selects the processing resources in the private cloud 444a and enters into a contract, the supply resource management 740 terminates its operation. Then, matching engine 105d initiates the orchestration tool 105e to allocate tasks to the selected processing resources. 8. A connection to the available processing resources may be triggered, for example, based on connectivity requirements of a resource directory of each of the available processing resources.

The internal processing resources in the private cloud 444a have access to the supply resource management 740a for the scheduling and allocation, and to composable infrastructure 740b to pool the processing resources and their associated data storage facilities. The composable infrastructure 740b in the example shown includes operating capabilities, such as compute, memory, storage, and networking. The external processing resources in the public cloud 444b have access to the API 750 for the scheduling and allocation. The external processing resources of the public cloud 444b may include one or more cloud providers 756, such as the external processing resource of the public cloud 444b described with respect to FIG. 5.

During operation, the computing system 100 may measure 752 (e.g., meter, monitor, and/or log) system performance. Various performance parameters, such as latency, deviation from specifications, and/or other metrics may be gathered and analyzed. The measuring 752 can be done using various tools, such as ONEVIEW, INFOSIGHT, GREENLAKE, etc. commercially available from HEWLETT PACKARD ENTERPRISE® out of Palo Alto, Calif.

Based on the measuring, the computing system 100 may dynamically adjust to the CoS 720 by providing a feedback of elastic supply 754. The elastic supply 754 determines capabilities of the performance resources and feeds such capabilities back to the business process and use case workload 710, which then adjusts the CoS 720. The elastic supply 754 may be used to view all processing resources equally, so that the process may be automatically expanded and contracted as demand dictates based on information from known assets. The selected processing resources may be contracted using 'pay as you go' facilities, such as GREENLAKE® commercially available from HEWLETT PACKARD ENTERPRISE® out of Palo Alto, Calif., for items in the private cloud 444a and/or pay on demand for items in the public cloud.

The private cloud 444a has a composable infrastructure 740b with common services and pooled capabilities that are composable (any can be selected and accessed as needed. The public cloud 444b has processing resources in separate cloud providers 756. Each of the processing resources may be capable of performing different tasks, and combine to allow the processing resources to access via the API 750 various features, such as the directory, the CoS attributes, and the price book. The public cloud 444b has a group of cloud providers Such common services may include, for example, ONEVIEW® or INFOSIGHT® commercially available from HEWLETT PACKARD ENTERPRISE® out of Palo Alto, Calif. The supply resource manager 740a and the API 750 may be used to provide visibility to the processing resources that are known and trusted.

Figure 8:
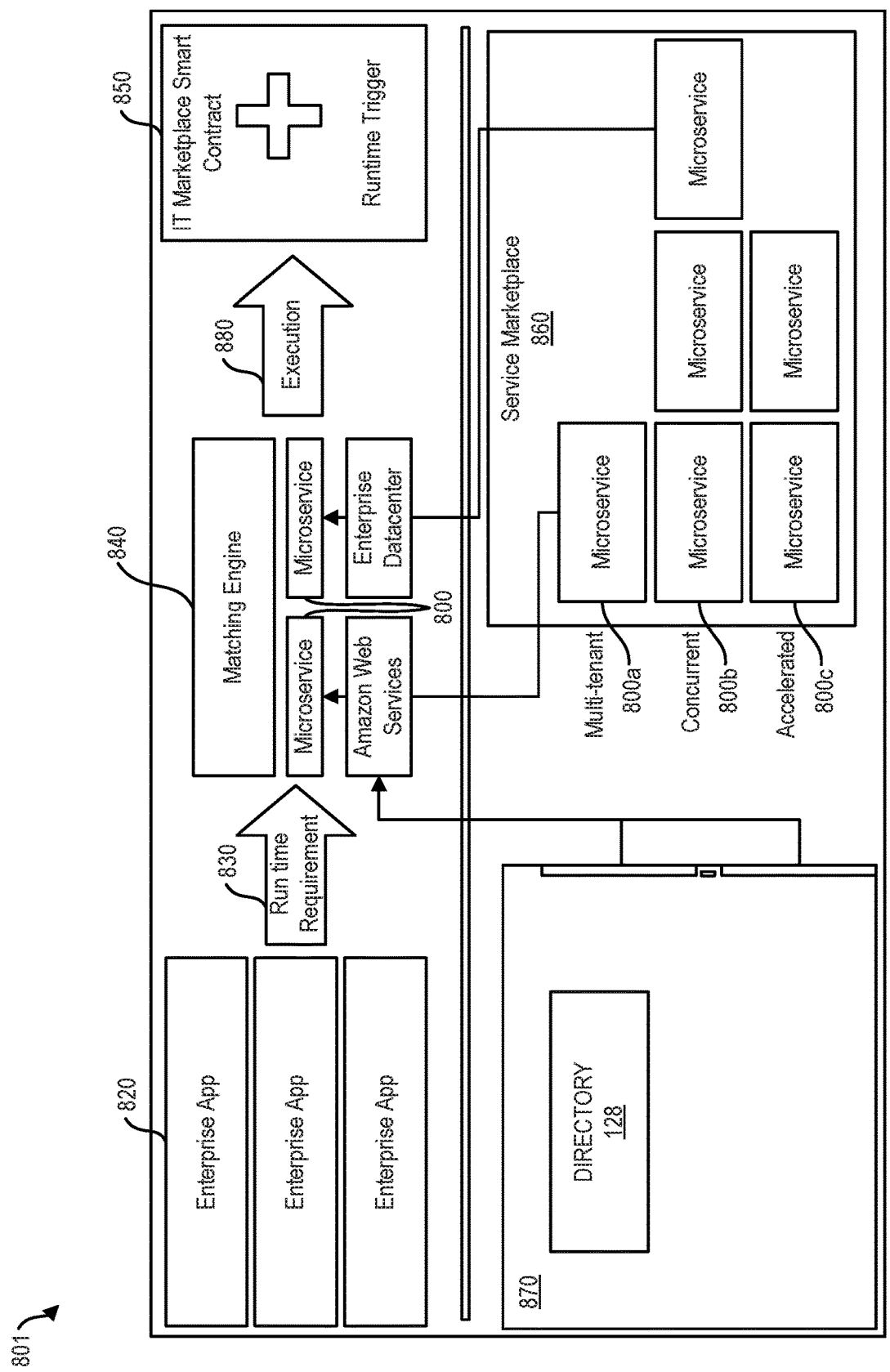
FIG. 8 is a schematic depicting matching of microservices using the computing system, according to one or more examples of the disclosure.

FIG. 8 is a schematic 801 depicting matching of microservices using the computing system, according to one or more examples of the disclosure. As shown in this example, enterprise apps 820 are submitted with requirements 830 to the matching engine 840, and, once matched, a smart contract 850 is executed 880. The enterprise app 820 are used to pass data to the microservices 800a-c. Various types of data may be input by the enterprise apps 820. The enterprise apps 820 may be, for example, one or more service requests submitted by a user to the computing system 100 (FIG. 1). The enterprise apps 820 may be assigned requirements, such as a run time requirement, setting forth the specifications and minimum operating levels for microservices for performing part or all of the applications on one or more processing resources. The run time requirement 830 may be determined based on the CoS 125 (FIG. 1).

The matching engine 840 searches available microservices 800 to determine which can meet the assigned requirements 830. The microservices 800 may be queried to determine requirements 830 of the microservice 800, as well as its dependent microservices. The microservices 800a-c may be available in a service marketplace 860 which has multiple available types of microservices, such as multi-tenant 800a, concurrent 800b, and accelerated 800c. One or more of the microservices may be selected by the matching engine 840 as matching the requirements 830, and queried for their capabilities, such as CoS and pricing.

The matching engine 840 may use the infrastructure marketplace 870 to select the microservices 800a-c. The infrastructure marketplace 870 acts as a supply resource manager (e.g., 740a of FIG. 7) or API (e.g., 750 of FIG. 7) to utilize various supporting components, such as a directory 128, to facilitate the matching. The directory 128 may be used to scale out to other resources, such as datacenters, accelerators, etc. The selected microservices 800 may be submitted for execution by smart contract 850. The orchestration tool 105e (FIG. 1) may be used to perform the execution 880.

Figure 9:
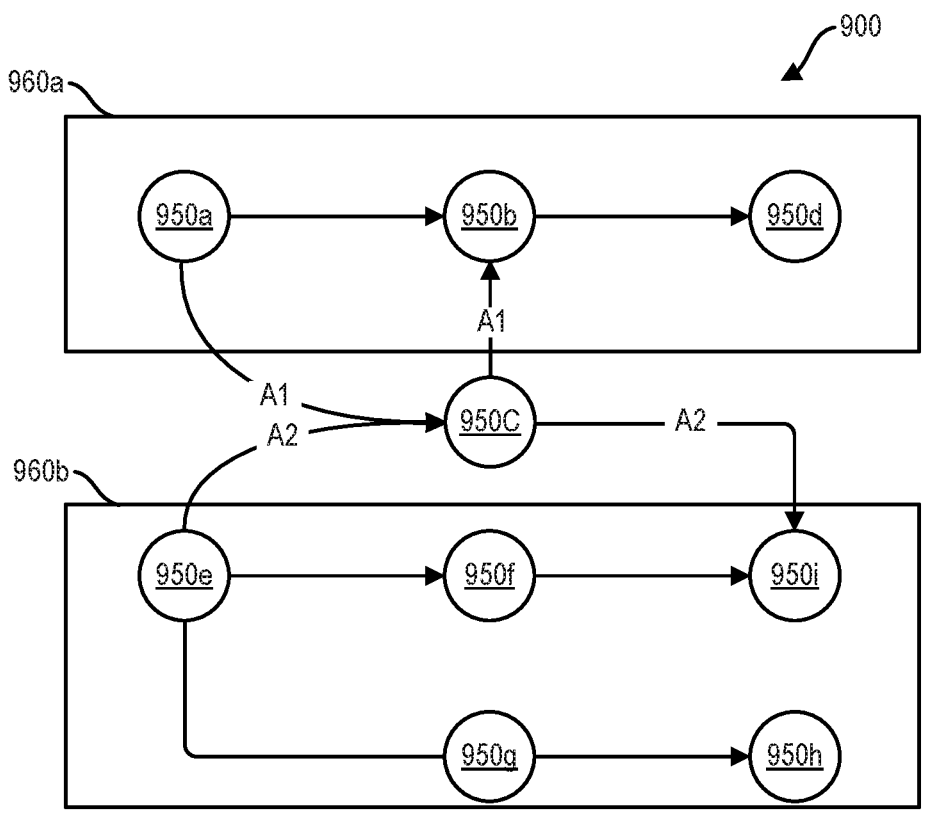
FIG. 9 is a schematic depicting a resource sharing using the computing system, according to one or more examples of the disclosure.

FIG. 9 is a schematic depicting task sharing using the computing system, according to one or more examples of the disclosure. FIG. 9 schematically shows flow of the tasks 950a-i as the tasks are performed to complete the applications 960a,b. As shown in this example, each of the applications 960a,b has tasks 950a-i associated with completion of such applications 960a,b, respectively. Tasks unique to each application, such as tasks 950a-b,950d-i may be performed separately for each of the application 960a.

The tasks 950a-i may be scheduled by the orchestration tool 105e (FIG. 1). Some functions may be performed by one of the microservices, and data passed to another microservice in a chain. One or more of the microservices may operate independently, and one or more may be coupled to cooperatively perform tasks together. By manipulating the processing to reduce time delays, share data, and share resources, the overall speed and cost of performing tasks may be reduced.

As demonstrated by task 950c, both applications 960a,b may share the same task(s). In such cases, the task 950c common to both applications 960a,b may be performed once for use with each of the applications, thereby eliminating repeated performance of the same task. Once the task 950c is completed, it may be used in connection with both the applications 960a,b. Additionally, the task 950c may be performed based on inputs from other tasks performed by one or both of the applications 960a,b.

Figure 10:
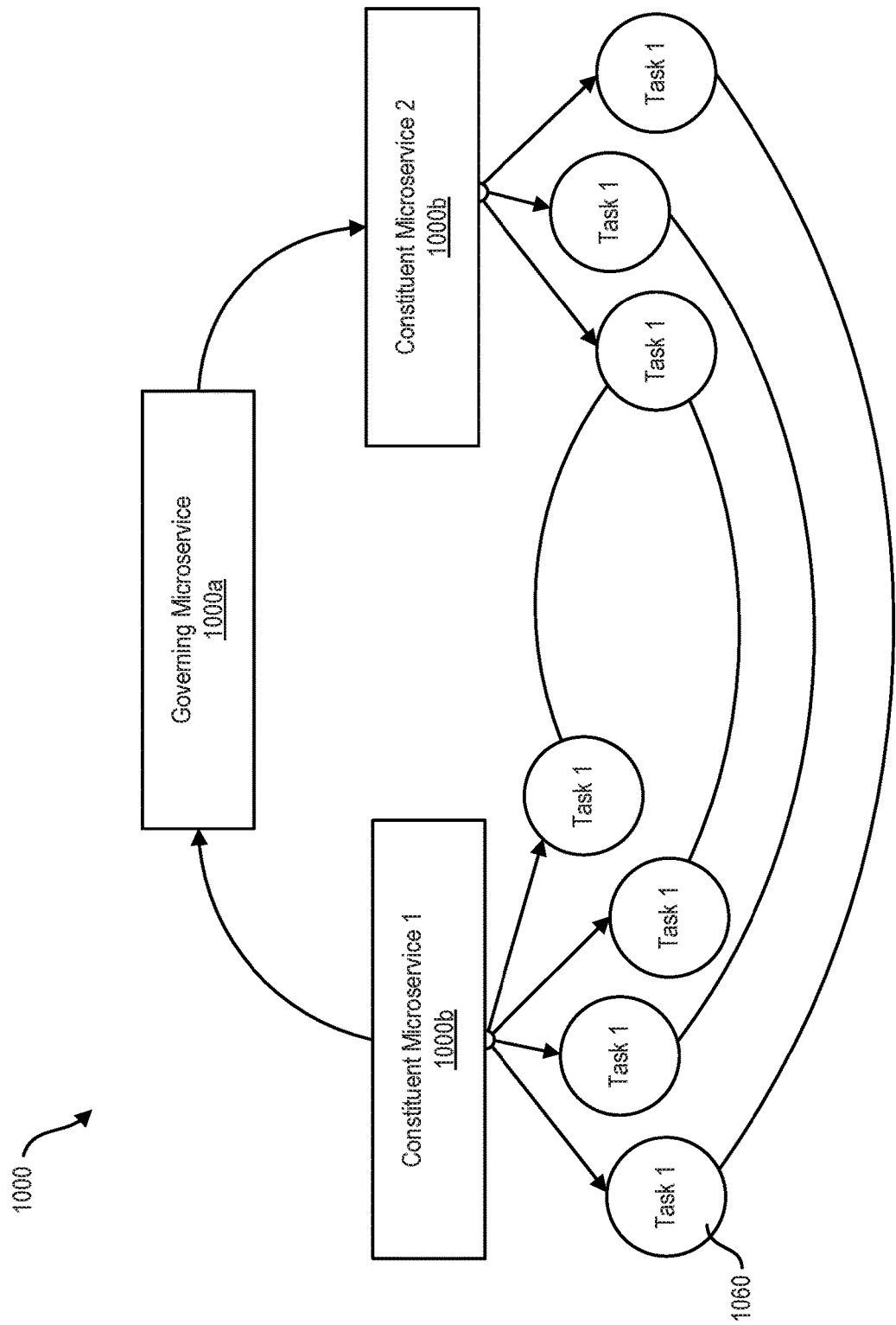
FIG. 10 is a schematic depicting a resource delegation for a pool of microservices in the computing system, according to one or more examples of the disclosure.

FIG. 10 is a schematic depicting a task delegation for a pool of microservices in the computing system, according to one or more examples of the disclosure. The computing system 100 and orchestration tool 105e of FIG. 1 may schedule the processing of the tasks for each application to optimize performance. Sequencing of tasks by each of the applications 960a,b may be defined to properly complete the application according to operating and regulatory requirements. As indicated by the arrows, data input from one task may be used for completion of a subsequent task. For example, both 950a and 950e provide input to task 950c. Task 950c then provides input into task 950b (and then 950d) and 950i. Some tasks or chains of tasks may be performed independently from others.

To achieve the common use of task 950c by both applications, scheduling for all of the tasks may be defined to allow both applications to simultaneously implement the task 950c. An overall optimization may be achieved by manipulating the order of the processing of the separate and common tasks for the applications. For example, as shown, application 960a performs tasks 950a, 950b, and 950d sequentially, and task 950c is performed simultaneously with task 950b; application 960b performs tasks 950e, 950g, and 950h sequentially, and performs task 950f simultaneously with task 950g; tasks 950b, 950c, 950f, and 950g may also be performed simultaneously; and task 950i is performed simultaneously with task 950h, but only after processing of task 950c. These and other arrangements of task scheduling may be manipulated to facilitate the performance of the tasks and the applications.

As shown in the example of FIG. 10, microservices (processing resources) may be pooled with associated microservices to define a service pool 1000 for performing one or more of the applications. The pool 1000 may define multiple tiers of dependent microservices including a governing microservice 1000a, and constituent (dependent) microservices 1000b. Such tiers may have multiple levels or a single level depending on needs and desired complexity/simplicity. The governing microservice 1000a may operate based on a set of rules, policies, and mechanics that enable governance of the application model for implementation.

The constituent microservices 1000b are dependently coupled to the governing microservice 1000a, such that the dependent microservices are latency and bandwidth dependent on the governing microservice 1000a. In the example shown, a governing microservice 1000a controls constituent microservices 1000b, and assigns to each of the constituent microservice 1000b specific tasks 1060 associated with the application. Each of the constituent microservices 1000b may share data in a distributed database for performing their respective portion of the assigned tasks.

The microservices 1000*a,b* may enter into smart contracts for performing the applications and/or tasks. The governing microservice 1000*a* may enter into a primary contract that cascades down to the constituent microservices 1000*b* based on dependencies. The pooling of the microservices 1000*a,b* may be used to assist in identification and verification of performance capabilities. In this manner, the respective microservices may be 'trusted' to meet CoS and operating requirements, including applicable regulatory requirements for the specific configuration, locations, and/or function of the applicable microservice.

Figure 11:
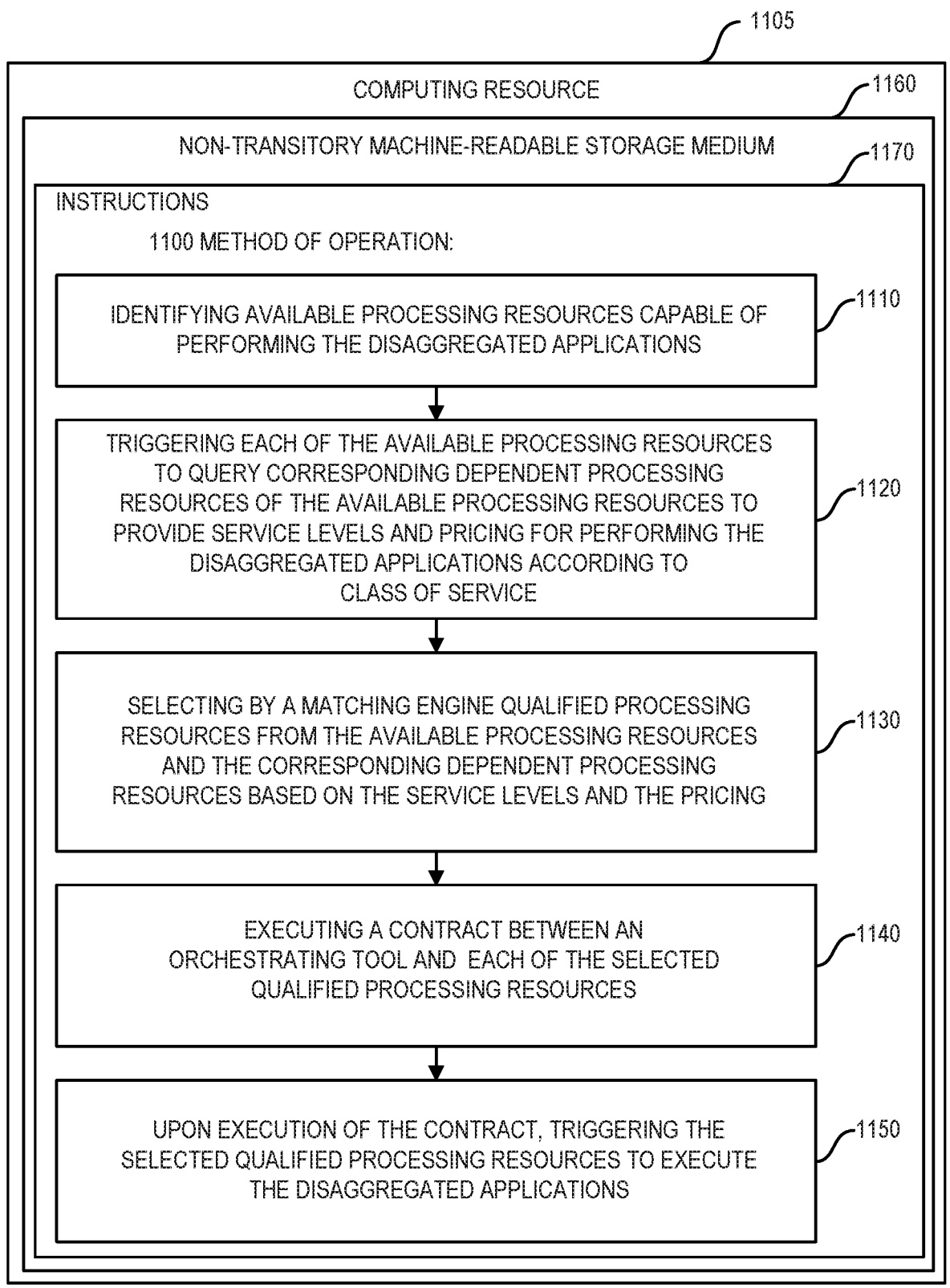
FIG. 11 is a flow chart depicting a method for orchestrating disaggregated applications, according to one or more examples of the disclosure.

FIG. 11 is a flow chart depicting a method 1100 for orchestrating disaggregated applications. The method 1100 involves identifying available processing resources capable of performing the disaggregated applications (block 1110); triggering each of the available processing resources to query corresponding dependent processing resources of the available processing resources to provide service levels and pricing for performing the disaggregated applications according to CoS (block 1120); selecting by a matching tool qualified processing resources from the available processing resources and the corresponding dependent processing resources based on the service levels and the pricing (block 1130); executing a contract between an orchestration tool and each of the selected qualified processing resources (block 1140); and upon execution of the contract, triggering the selected qualified processing resources to execute the disaggregated applications (block 1150).

The method may also involve, searching a directory for a certified list of processing resources and querying the certified list for service levels; calculating the CoS for performing the disaggregated applications; selecting a narrowest band from inherited CoS, application-specific CoS, and run-time CoS for the available processing resources; negotiating service level agreement and service level objectives with each of the available processing resources and the dependent processing resources; querying a resource directory of each of the available processing resources for each parameter of the CoS and negotiating service level agreement for each of the dependent processing resources; executing the contract with a governing processing resource and cascading the contract down to the dependent processing resources for execution; upon execution of the contract, triggering a connection to the available processing resources based on connectivity requirements of a resource directory of each of the available processing resources; monitoring the processing resources during execution of the disaggregated applications; and/or repeating the method based on the monitoring. The available processing resources may be identified by searching a system directory. The triggering may comprise searching a resource directory.

The method may be implemented by a non-transitory machine-readable storage medium 1160. The storage medium 1160 comprises instructions 1170, that, when executed cause a computing system 100 to perform the method 1100. The method may be performed in any order and repeated as desired.

As provided above, examples in the present disclosure may also be directed to a non-transitory computer-readable medium storing computer-executable instructions and executable by one or more processors of the computer via which the computer-readable medium is accessed. A computer-readable media may be any available media that may be accessed by a computer. By way of example, such computer-readable media may include random access memory (RAM), read-only memory (ROM), electrically erasable programmable read-only memory (EEPROM), compact disk read-only memory (CD-ROM) or other optical disk storage, magnetic disk storage or other magnetic storage devices, or any other medium that may be used to carry or store desired program code in the form of instructions or data structures and that may be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Note also that the software implemented aspects of the subject matter claimed below are usually encoded on some form of program storage medium or implemented over some type of transmission medium. The program storage medium is a non-transitory medium and may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The claimed subject matter is not limited by these aspects of any given implementation.

Furthermore, examples disclosed herein may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Obviously, many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the claims and their equivalents below.

What is claimed is:

1. A method for orchestrating disaggregated applications, the method comprising:

identifying available processing resources capable of performing the disaggregated applications, each application including one or more tasks, one or more of the available processing resources being linked to one or more dependent processing resources;

querying corresponding dependent processing resources of the available processing resources regarding capability of the dependent processing resources to perform the disaggregated applications according to a class of service, the class of service being based on parameters comprising at least an indication of latency for the dependent processing resources;

selecting, by a matching tool, qualified processing resources from the available processing resources and the corresponding dependent processing resources based on the class of service with corresponding indication of latency for the dependent processing resources and latency parameters for the disaggregated applications, selecting qualified processing resources including matching the one or more tasks for each application with the available processing resources and corresponding dependent processing resources capable of performing the one or more tasks;

executing a smart contract in blockchain between an orchestration tool and each of the selected qualified processing resources; and upon execution of the smart contract, triggering the selected qualified processing resources to execute the disaggregated applications.

2. The method of claim 1, wherein the identifying the available processing resources comprises searching a directory for a certified list of processing resources and querying the certified list of processing resources for service levels.

3. The method of claim 1, wherein the identifying the available processing resources comprises calculating the class of service for performing the disaggregated applications.

4. The method of claim 1, wherein the identifying the available processing resources comprises selecting a narrowest band from inherited class of service, application-specific class of service, and run-time class of service for the available processing resources.

5. The method of claim 1, wherein the querying of the available processing resources comprises negotiating service level agreement and service level objectives with each of the available processing resources and the dependent processing resources.

6. The method of claim 1, wherein the querying of the available processing resources comprises querying a directory for each parameter of the class of service for each of the available processing resources, and negotiating service level agreement for each of the dependent processing resources.

7. The method of claim 1, wherein the executing the smart contract comprises executing the smart contract with a governing processing resource and cascading the smart contract down to the dependent processing resources for execution.

8. The method of claim 1, further comprising, upon execution of the smart contract, triggering a connection to the available processing resources based on connectivity requirements of a resource directory of each of the available processing resources.

9. The method of claim 1, further comprising monitoring the selected qualified processing resources during execution of the disaggregated applications.

10. The method of claim 9, further comprising repeating the method based on the monitoring.

11. The method of claim 1, further comprising using structure of the blockchain to verify identification of each contracting processing resource and to maintain accountability of each contracting processing resource.

12. A computer-readable, non-transitory storage medium encoded with instructions that, when executed by a computing resource, cause the computing resource to:

identify available processing resources capable of performing disaggregated applications, each application including one or more tasks, one or more of the available processing resources being linked to one or more dependent processing resources;

querying corresponding dependent processing resources of the available processing resources regarding capability of the dependent processing resources to perform the disaggregated applications according to class of service, the class of service being based on parameters comprising at least an indication of latency for the dependent processing resources;

select, by a matching tool, qualified processing resources from the available processing resources and the corresponding dependent processing resources based on the class of service with corresponding indication of latency for the dependent processing resources and latency parameters for the disaggregated applications, selecting qualified processing resources including matching the one or more tasks for each application with the available processing resources and corresponding dependent processing resources capable of performing the one or more tasks;

execute a smart contract in blockchain between an orchestration tool and each of the selected qualified processing resources; and upon execution of the smart contract, trigger the selected qualified processing resources to execute the disaggregated applications.

13. The computer-readable, non-transitory storage medium of claim 12, wherein the identify available processing resources comprises searching a system directory.

14. The computer-readable, non-transitory storage medium of claim 12, wherein the triggering comprises searching a resource directory.

15. A computing system for orchestrating disaggregated applications, comprising:

a plurality of processing resources; and a computing resource to:

identify available processing resources of the plurality of processing resources capable of performing the disaggregated applications, each application including one or more tasks, one or more of the available processing resources being linked to one or more dependent processing resources;

querying corresponding dependent processing resources of the available processing resources regarding capability of the dependent processing resources to perform the disaggregated applications according to class of service, the class of service being based on parameters comprising at least an indication of latency for the dependent processing resources;

select, by a matching tool, qualified processing resources from the available processing resources and the corresponding dependent processing resources based on the class of service with corresponding indication of latency for the dependent processing resources and latency parameters for the disaggregated applications, selecting qualified processing resources including matching the one or more tasks for each application with the available processing resources and corresponding dependent processing resources capable of performing the one or more tasks;

execute a smart contract in blockchain between an orchestration tool and each of the selected qualified processing resources; and upon execution of the smart contract, trigger the selected qualified processing resources to execute the disaggregated applications.

16. The computing system of claim 15, wherein the plurality of processing resources are on a hybrid cloud.

17. The computing system of claim 15, wherein a portion of the plurality of processing resources is on a private cloud and another portion of the plurality of processing resources is on a public cloud.

18. The computing system of claim 15, wherein the processing resources comprise governing microservices and the dependent processing resources comprise constituent microservices of the governing microservices.

19. The computing system of claim 18, wherein the constituent microservices share a database.

20. The computing system of claim 15, wherein the plurality of processing resources each comprise at least one of: a multi-core processor, a ram memory, a network Interface, and disk storage devices.

21. The computing system of claim 15, wherein the computing resource comprises at least one of: business operations, development operations, a catalyst composer, the matching tool, and the orchestration tool.

\* \* \* \* \*